United States Patent
Ohkuma et al.

(10) Patent No.: US 8,269,921 B2
(45) Date of Patent: Sep. 18, 2012

(54) LIQUID CRYSTAL DISPLAY DEVICE AND COLOR FILTER FOR LIQUID CRYSTAL DISPLAY DEVICE

(75) Inventors: Satoshi Ohkuma, Tokyo (JP); Atsuko Kamada, Tokyo (JP); Yoshiko Ishimaru, Tokyo (JP); Kenji Muneuchi, Tokyo (JP); Hidesato Hagiwara, Tokyo (JP); Takashi Yamauchi, Tokyo (JP); Noriko Asahi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 44 days.

(21) Appl. No.: 12/805,018

(22) Filed: Jul. 7, 2010

(65) Prior Publication Data

US 2010/0271569 A1 Oct. 28, 2010

Related U.S. Application Data

(63) Continuation of application No. PCT/JP2008/073216, filed on Dec. 19, 2008.

(30) Foreign Application Priority Data

Jan. 7, 2008 (JP) .................. 2008-000674

(51) Int. Cl.
*G02F 1/1335* (2006.01)
(52) U.S. Cl. .......................... 349/70; 349/106
(58) Field of Classification Search .................. None
See application file for complete search history.

(56) References Cited

U.S. PATENT DOCUMENTS

| 2003/0169523 A1* | 9/2003 | Takeda .................. 359/885 |
| 2004/0008299 A1 | 1/2004 | Fujimaki et al. |
| 2005/0225701 A1 | 10/2005 | Fujimaki et al. |

FOREIGN PATENT DOCUMENTS

| JP | 2003-161823 | 6/2003 |
| JP | 2003-167113 | 6/2003 |
| JP | 2003-295171 | 10/2003 |
| JP | 2004-117537 | 4/2004 |
| JP | 2006-113099 | 4/2006 |
| JP | 2006-184427 | 7/2006 |
| JP | 2007-5111 | 1/2007 |
| JP | 2007-88348 | 4/2007 |
| JP | 2010-26107 | 2/2010 |

OTHER PUBLICATIONS

English Translation of the International Preliminary Report on Patentability issued Aug. 19, 2010 in corresponding International Patent Application PCT/JP2008/073216.
International Search Report for PCT/JP2008/073216, mailed Jan. 20, 2009.
Japanese Office Action dated May 22, 2012 issued in corresponding Japanese Patent Application No. 2008-000674 X.

* cited by examiner

*Primary Examiner* — Lucy Chien

(57) ABSTRACT

A liquid crystal display device which includes a backlight device provided with an LED, and a color filter having colored layers of plural colors including a green layer, wherein the green layer of the color filter contains brominated zinc phthalocyanine green pigment and a dielectric loss tangent of the green layer at a driving frequency of a liquid crystal display device is confined to not more than 0.02.

12 Claims, 3 Drawing Sheets

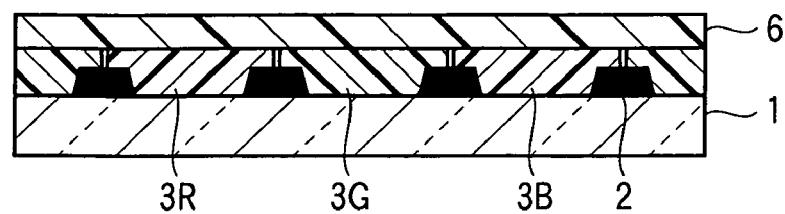
F I G. 1
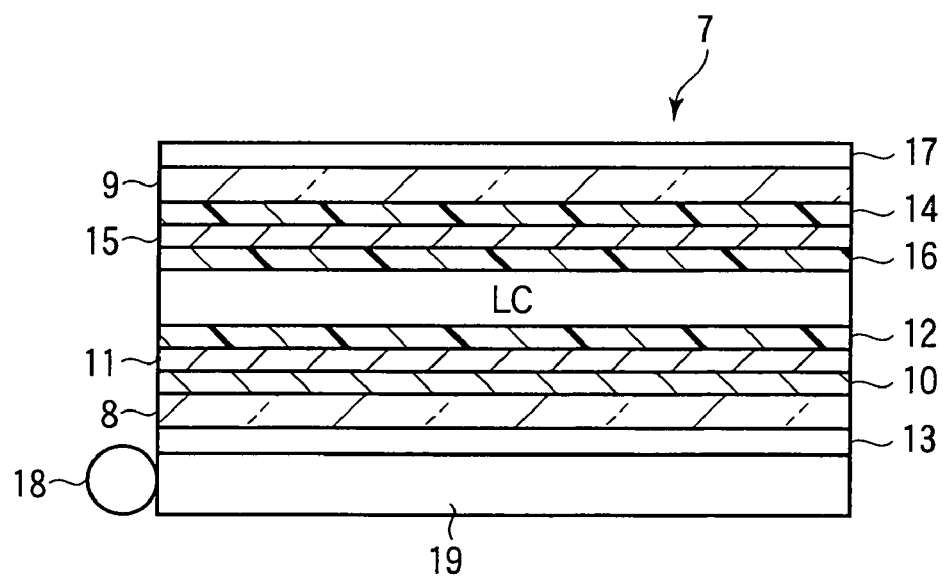
F I G. 2

LIQUID CRYSTAL DISPLAY DEVICE AND COLOR FILTER FOR LIQUID CRYSTAL DISPLAY DEVICE

CROSS-REFERENCE TO RELATED APPLICATIONS

This is a Continuation application of PCT Application No. PCT/JP2008/073216, filed Dec. 19, 2008, which was published under PCT Article 21(2) in Japanese.

This application is based upon and claims the benefit of priority from prior Japanese Patent Application No. 2008-000674, filed Jan. 7, 2008, the entire contents of which are incorporated herein by reference.

BACKGROUND OF THE INVENTION

1. Field of the Invention

The present invention relates to a liquid crystal display device and a color filter for the liquid crystal display device. In particular, the present invention relates to a liquid crystal display device having a color filter capable of exhibiting excellent color reproduction properties while preventing the electrical properties of the colored layers and the overcoat layer thereof from having an adverse influence on the liquid crystal switching property and to the display device.

2. Description of the Related Art

A color liquid crystal display device is now rapidly propagated especially as an image display device for television and as a terminal display device for computers. The color filter is an important component which is indispensable for realizing the color display of such a liquid crystal display device. In recent years, in response to the increasing demands for enhancing the image qualities of a liquid crystal display device, there have been developed liquid crystal display devices of various new systems wherein the view angle is increased or the responding properties are accelerated. Among them, an IPS system (In Plane Switching system) is expected to be widely propagated because of the excellentness in display qualities in terms of the view angle, the contrast ratio, etc.

However, since the colored layers of color filter exist in the liquid-crystal-driving electric field in the case of the liquid crystal display device of the IPS system in different to other liquid crystal display devices of the twisted nematic (TN) or vertical alignment (VA) system, the liquid crystal display device of the IPS system is accompanied with a problem that the display device is directly influenced by the electrical properties of the materials of the colored layers. As a matter of fact, when the colored layers formed of the conventional materials are employed in the liquid crystal display device of the IPS system, there have been recognized various display failures such as turbulences in the alignment of liquid crystal which originate from the electrical properties of the colored layers or the image burn (a phenomenon wherein an image is permitted to remain in a display screen for a long time) due to deviation of the threshold values of switching.

The electrical properties of the materials for the colored layers mainly depend on the characteristics of pigments to be employed as coloring agents and hence it is fundamentally difficult to avoid the influences of the characteristics of coloring agents. Therefore, when a color filter wherein the colored layers formed of the conventional materials are used is employed in the liquid crystal display device of the IPS system, it is generally practiced to provide the color filter with a protective layer (overcoat layer) which is made of a transparent resin (see JP-A 2004-117537, for example).

Certainly, although it is possible, due to the provision of the overcoat layer made of a transparent resin, to employ the colored layers formed of the conventional materials in the liquid crystal display device of the IPS system, there is still a possibility of generating various display failures even if the overcoat layer is employed. There have been proposed improvements on the materials for the colored layers as well as on the materials for the overcoat layer (see JP-A 2006-113099, for example). Incidentally, it may be conceivable to reduce the quantity of the materials for the colored layers which are a fundamental cause for the display failures in order to secure satisfactory performances of the liquid crystal display device, the reduction in quantity of the materials for the colored layers may lead to the deterioration of color reproducibility.

BRIEF SUMMARY OF THE INVENTION

It is an object of the present invention to provide a liquid crystal display device, especially the liquid crystal display device of the IPS system, having a color filter capable of exhibiting excellent color reproduction properties while making it possible to prevent the electrical properties of the colored layers of color filter from giving adverse influences to the switching property of liquid crystal.

According to a first aspect of the present invention, there is provided a liquid crystal display device which comprises: a backlight device provided with an LED; and a color filter comprising colored layers of plural colors including a green layer, wherein the green layer of the color filter contains brominated zinc phthalocyanine green pigment and a dielectric loss tangent of the green layer at a driving frequency of a liquid crystal display device is confined to not more than 0.02.

According to a second aspect of the present invention, there is provided a liquid crystal display device which comprises: a backlight device provided with an LED; and a color filter comprising colored layers of plural colors including at least a green layer and an overcoat layer formed of a transparent resin, wherein the green layer of the color filter contains brominated zinc phthalocyanine green pigment and a dielectric loss tangent of a laminate layer of the green layer and the overcoat layer at a driving frequency of a liquid crystal display device is confined to not more than 0.02.

According to a third aspect of the present invention, there is provided a color filter for the liquid crystal display device of the first aspect of the invention, wherein the green layer contains a green pigment formed of brominated zinc phthalocyanine and a yellow pigment, a content of the green pigment in a total weight of the pigments is not more than 70%, and a content of the green pigment in a weight of the green layer is not more than 30%.

According to a fourth aspect of the present invention, there is provided a color filter for the liquid crystal display device of the second aspect of the invention, wherein the green layer contains a green pigment formed of C.I. Pigment Green 58 and at least one kind of yellow pigment selected from the group consisting of C.I. Pigment Yellow 185, C.I. Pigment Yellow 150, C.I. Pigment Yellow 139 and C.I. Pigment Yellow 138, a content of the C.I. Pigment Green 58 in a total weight of the pigments is not more than 70%, and a content of the pigment in a weight of the green layer is not more than 30%.

BRIEF DESCRIPTION OF THE SEVERAL VIEWS OF THE DRAWING

FIG. 1 is a cross-sectional view schematically illustrating the color filter according to one embodiment of the present invention;

FIG. 2 is a cross-sectional view schematically illustrating one example of the color filter according to one embodiment of the liquid crystal display device provided with the color filter shown in FIG. 1;

DETAILED DESCRIPTION OF THE INVENTION

Figure 3:
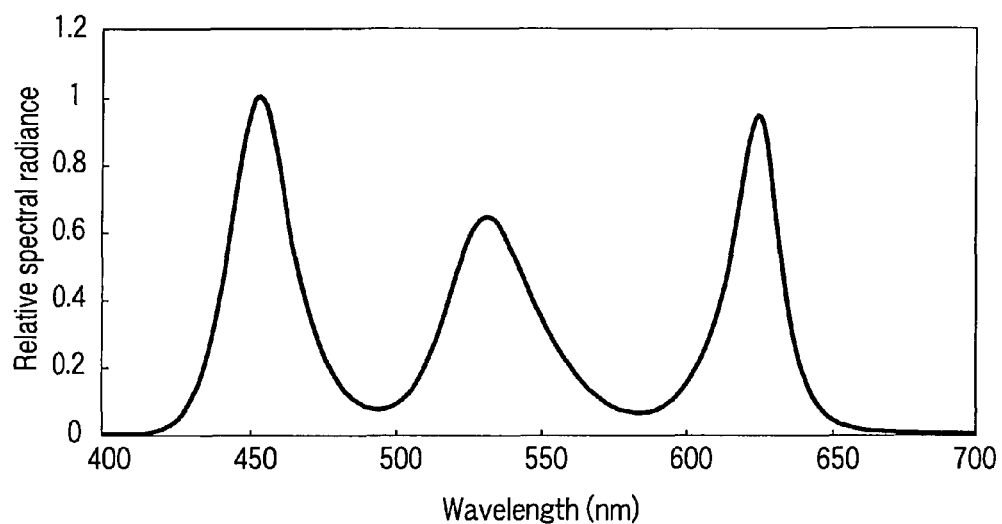
FIG. 3 is a graph illustrating the emission characteristics of a white color light source wherein a color mixture is effected through the combination of a red LED, a green LED and a blue LED.

Followings are the explanation of various embodiments of the present invention.

With respect to the relationship between the electrical characteristics of color filter and the display failure in the liquid crystal display device of the IPS system, the turbulence in alignment of liquid crystal and the deviation of the threshold values of switching in the liquid crystal display device of the IPS system are known to originate mainly from the dielectrical properties of the materials of colored layers.

The dielectric loss tangent (tan δ) is a ratio between the quantity of charge that can be accumulated in a dielectric substance and the quantity of charge that can be consumed. If the dielectric loss tangent is relatively small, the electric charge that has been accumulated in the dielectric substance can be retained therein. If the dielectric loss tangent is relatively large, the electric charge cannot be retained therein due to the consumption thereof.

In the case of the liquid crystal display device of the IPS system, since the colored layers of color filter are existed in the liquid-crystal-driving electric field, the charge-retaining state thereof is caused to become non-uniform as the difference in value between the dielectric loss tangent of the colored layers of color filter and the dielectric loss tangent of other components disposed in the cell (such as liquid crystal and alignment film) becomes large. When the charge-retaining state becomes non-uniform, the electric field in the vertical direction that may not be generated in the case of the liquid crystal display device of the IPS system is generated, thereby inviting the orientation failure of the liquid crystal or inviting the image burn (a phenomenon wherein an image is permitted to remain in a display picture for a long time) due to the deviation of the threshold values resulting from redundant electric charge remaining in the display, thus resulting in display failures.

Therefore, the dielectric loss tangent of the coloring materials of color filter is one of important characteristics that determine the display performance of the liquid crystal display device of the IPS system. This dielectric loss tangent is a value which depends on the measuring frequency. Therefore, since the one frame for driving liquid crystal is confined to the range of about 60-120 Hz, it is more appropriate to pay attention to the dielectric loss tangent at a cycle (seconds) of, i.e. a frequency of nearly 30-60 Hz or a frequency of around 10-200 Hz.

Generally, the materials for liquid crystal as well as the materials for alignment film are large in capability of retaining electric charge. Namely, these materials are relatively small in dielectric loss tangent, the value thereof generally falling within the range of 0.005-0.02 or so. It is generally considered preferable that the value of dielectric loss tangent of the coloring materials of color filter is almost the same level as that of the dielectric loss tangent of the materials for alignment film.

It is already known that the cause of the deterioration of dielectric properties in the conventional color filter is the existence of free low molecular compounds containing halogen originating from halogenated copper phthalocyanine (C.I. Pigment Green 36) which is employed as a green pigment and that the suppression of the quantity of this compound is effective in overcoming this problem.

As means for overcoming this problem, various methods have been adopted, including a method of improving the refining of halogenated copper phthalocyanine and a method of reducing the concentration of halogenated copper phthalocyanine to a predetermined level. However, there is a technical limitation in improving the refining of halogenated copper phthalocyanine and when the concentration of halogenated copper phthalocyanine is reduced, the color reproduction properties of the color filter deteriorates.

It has been found out by the present inventors that in the case of a liquid crystal display device comprising a backlight device provided with a light-emitting diode (LED), and a color filter including colored layers of plural colors at least having a green layer, when the color filter thereof is constructed such that the green layer of the color filter contains brominated zinc phthalocyanine green pigment (C.I. Pigment Green 58) and that the dielectric loss tangent of the green layer at the driving frequency of a liquid crystal display device is confined to not more than 0.02, preferably not more than 0.01, it is possible to effectively prevent the deterioration of display quality such as pixel alignment failures, deviation of threshold values, etc.

Namely, the liquid crystal display device according to a first aspect of the present invention is featured in that it comprises a backlight device provided with a light-emitting diode (LED), and a color filter including colored layers of plural colors having a green layer, wherein the green layer of the color filter contains C.I. Pigment Green 58 and the dielectric loss tangent of the green layer at the driving frequency of a liquid crystal display device is confined to not more than 0.02.

Further, it has been found out by the present inventors that in the case where an overcoat layer is disposed on the color filter for the purpose of flattening the surface of color filter, when the color filter thereof is constructed such that the dielectric loss tangent of a laminate layer consisting of the green layer and the overcoat layer at the driving frequency of a liquid crystal display device is confined to not more than 0.02, preferably not more than 0.01, it is possible to effectively prevent the deterioration of display quality such as pixel alignment failures, deviation of threshold values, etc.

Namely, the liquid crystal display device according to a second aspect of the present invention is featured in that it comprises a backlight device provided with a light-emitting diode (LED), and a color filter including colored layers of plural colors having at least a green layer and an overcoat layer made of a transparent resin, wherein the green layer of the color filter contains C.I. Pigment Green 58 and the dielectric loss tangent of a laminate layer of the green layer and the overcoat layer at the driving frequency of a liquid crystal display device is confined to not more than 0.02.

Since the dielectric properties are influenced by coloring materials such as pigments including C.I. Pigment Green 58 (brominated zinc phthalocyanine green pigment) existing in the green layer, the content of coloring materials is required to be confined to not more than 30% by weight, preferably 20% by weight, more preferably 18% by weight based on a total weight of the solid matter of the green layer. However, since the reduction of the content of coloring materials leads to the deterioration of color reproducibility, the chromaticity on the occasion of using an LED back-light is required to be such that "y" is not less than 0.60, preferably not less than 0.62 in the XYZ color system and also the color reproduction region of the color filter is required to be not less than 70% based on the NTSC ratio. In order to realizing these requirements, the content of coloring materials would not be less than 10% by weight based on a total weight of the solid matter of the green layer.

The backlight device may be constructed so as to be provided with a red LED, a green LED and a blue LED. Alternatively, the backlight device may be constructed so as to be provided with a white LED device formed of a combination of a blue LED, a green fluorescent substance and a red fluorescent substance.

As described above, since the liquid crystal display devices according to the first and the second aspects of the present invention are featured in that they respectively comprise a backlight device provided with an LED, and a color filter wherein the dielectric loss tangent of the green layer or of a laminate layer consisting of the green layer and the overcoat layer at the driving frequency of a liquid crystal display device is confined to not more than 0.02, it is possible to provide a liquid crystal display device, especially a liquid crystal display device of the IPS system, which is capable of exhibiting excellent color reproduction properties while preventing the electrical properties of the colored layers of color filter from giving adverse influences to the switching property of liquid crystal.

As described above, among coloring materials, green pigments are especially poor in dielectric properties. Therefore, the content of C.I. Pigment Green 58 may be confined to as small as possible. Specifically, the weight content of the C.I. Pigment Green 58 in the green layer containing the C.I. Pigment Green 58 and a yellow pigment may be confined to not more than 70%, preferably not more than 60%, more preferably not more than 50% based on a total weight of pigments. Although it is preferable to decrease the mixing ratio of the C.I. Pigment Green 58, if the content of the C.I. Pigment Green 58 is too small, the light transmittance of the green region is caused to increase, thereby causing the color reproducibility to deteriorate. Therefore, the lower limit of the content of the C.I. Pigment Green 58 may be around 35%.

Next, the manufacturing method of the color filter to be employed in the aforementioned liquid crystal display device will be explained in detail.

As for the transparent substrate to be employed as a color filter substrate, it is preferable to employ those exhibiting a certain degree of transmittance to visible light, more preferably those exhibiting a light transmittance of not less than 80%. Generally, it is possible to employ those used in ordinary liquid crystal display devices, examples thereof including a plastic substrate such as a PET substrate and a glass substrate. Generally, it is preferable to employ a glass substrate. In the case where a light-shielding pattern which is generally called "black matrix" is to be employed, it is possible to employ a transparent substrate having a lattice pattern formed thereon by means of the conventional method by making use of a metallic thin film made of chromium, etc. or by making use of a light-shielding resin, the lattice pattern being partitioned every pixel.

With respect to the method of manufacturing the colored layer on the transparent substrate, it is possible to employ any of the known methods including an ink jet method, a printing method, a photo-resist method and an etching method. However, when high definition, the controllability of spectral characteristics and the reproducibility are taken into consideration, it is preferable to employ a photolithography method. In this photolithography method, a pigment dispersed in a transparent resin is dispersed in a suitable solvent together with a photo-polymerization initiator and a polymeric monomer to form a coloring composition which is then coated on a transparent substrate to form a coloring composition layer. This coloring composition layer is then subjected to patterning exposure and to development, thereby creating pixels of one color. These steps are repeated for each color including, for example, red, green and blue.

With respect to the method of forming a coloring layer constituting the pixels of the color filter, it may be performed as follows for example. First of all, a pigment to be employed as a coloring agent is dispersed in a transparent resin and then mixed into a suitable solvent together with a photo-polymerization initiator and a polymeric monomer to prepare a coloring composition. As for the method of dispersing the pigment to be employed as a coloring agent, it is possible to employ various kinds of device including a mill base, a triple roll mill, a jet mill, etc. Namely, there is not any particular limitation with regard to the method of dispersing the pigment.

The following are specific examples of the organic pigment that can be used in the coloring composition for forming colored layers constituting the pixels of each of the red, green and blue colors of a color filter, these organic pigments being respectively represented by a color index (C.I.) number.

As for the red pigment, it is possible to employ C.I. Pigment Red 254, 7, 9, 14, 41, 48:1, 48:2, 48:3, 48:4, 81:1, 81:2, 81:3, 122, 123, 146, 149, 168, 177, 178, 179, 180, 184, 185, 187, 192, 200, 202, 208, 210, 215, 216, 217, 220, 223, 224, 226, 227, 228, 240, 246, 255, 264, 272, 279, etc.

As for the yellow pigment, it is possible to employ, other than C.I. Pigment Yellow 150 and PY 138, PY 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 139, 144, 146, 147, 148, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214, etc.

As for the orange pigment, it is possible to employ C.I. Pigment Orange 36, 43, 51, 55, 59, 61, 71, 73, etc.

As for the green pigment, it is possible to employ, other than C.I. Pigment Green 36, PG 7, 10, 37, etc.

As for the blue pigment, it is possible to employ C.I. Pigment Blue 15, 15:1, 15:2, 15:3, 15:4, 15:6, 16, 22, 60, 64, 80, etc.

As for the violet pigment, it is possible to employ C.I. Pigment Violet 1, 19, 23, 27, 29, 30, 32, 37, 40, 42, 50, etc.

The above-described pigments may be used singly or in combination of two or more kinds depending on the kind of colored layer.

In order to secure excellent coating properties, sensitivity and developing properties of a coloring composition while making it possible to retain balance between the chroma and lightness, the aforementioned organic pigments may be used in combination with an inorganic pigment. As for specific examples of the inorganic pigment, they include metal oxide powder, metal sulfide powder and metal powder, such as yellow lead, zinc yellow, red iron oxide (red iron oxide (III)), cadmium red, ultramarine blue, Prussian blue, chromium oxide green, cobalt green, etc. Further, for the purpose of toning, coloring composition may further contain dyes within the limits which do not cause the thermal resistance of the color filter to deteriorate.

The transparent resin to be employed in the coloring composition may preferably have a permeability of not less than 80%, more preferably not less than 95% in a total wavelength range of 400-700 nm of visible light zone. As for specific examples of the transparent resin, it is possible to employ thermoplastic resin, thermosetting resin and photosensitive resin. If required, these transparent resins may be formed of the precursors thereof, i.e. monomers or oligomers which are capable of forming transparent resins as they are cured by the irradiation of radiation. These monomers and oligomers can be used singly or in combination of two or more kinds.

As for the thermoplastic resin, it is possible to employ, for example, butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene, polyamide resin, rubber resin, cyclized rubber-based resin, celluloses, polyethylene, polybutadien, polyimide, etc. As for the thermosetting resin, it is possible to employ, for example, epoxy resin, benzoguanamine resin, rosin-modified maleic resin, rosin-modified fumaric acid resin, melamine resin, urea resin, phenol resin, etc.

As for the photosensitive resin, it is possible to employ resins obtained by reacting a linear macromolecule having a reactive substituent group such as hydroxyl group, carboxyl group, amino group, etc. with a (metha)acrylic compound having a reactive substituent group such as isocyanate group, aldehyde group, epoxy group, etc. or cinnamic acid, in which a photo-curable group such as (metha)acryloyl group, styryl group, etc. has been introduced into the linear macromolecule by the reaction. It is also possible to employ a resin obtained by half-esterifying a linear macromolecule containing an acid anhydride such as styrene-maleic anhydride copolymer or α-olefin-maleic anhydride copolymer, with a (metha)acrylic compound having hydroxyl group such as hydroxyalkyl (metha)acrylate.

As for representative examples of the polymerizable monomer that can be used as a photo-crosslinking agent, they include various kinds of acrylic ester and methacrylic ester such as trimethylolpropane tri(metha)acrylate, pentaerythritol tri(metha)acrylate, dipentaerythritol hexa(metha)acrylate, ethylene oxide-modified trimethylolpropane tri(metha)acrylate, propylene oxide-modified trimethylolpropane tri (metha)acrylate, etc. These esters can be used singly or in combination of two or more kinds. Further, if required, for the purpose of appropriately keeping the photo-curability of monomer, other kinds of polymerizable monomers or oligomers may be mixed into these esters.

With respect to the specific examples of other kinds of polymerizable monomers or oligomers, they include various kinds of acrylic esters and methacrylic esters such as methyl (metha)acrylate, ethyl(metha)acrylate, 2-hydroxyethyl (metha)acrylate, 2-hydroxypropyl(metha)acrylate, cyclohexyl(metha)acrylate, β-carboxyethyl(metha)acrylate, diethyleneglycol di(metha)acrylate, 1,6-hexanediol di(metha)acrylate, triethyleneglycol di(metha)acrylate, tripropyleneglycol di(metha)acrylate, trimethylolpropane tri (metha)acrylate, pentaerythritol tri(metha)acrylate, 1,6-hexanediol diglycidyl ether di(metha)acrylate, bisphenol A diglycidyl ether di(metha)acrylate, neopentylglycol diglycidyl ether di(metha)acrylate, dipentaerythritol hexa(metha)acrylate, tricyclodecanyl (metha)acrylate, ester acrylate, (metha) acrylate of methyloled melamine, epoxy(metha)acrylate, urethane acrylate, etc.; (metha)acrylic acid; styrene; vinyl acetate; hydroxyethylvinyl ether, ethylene glycol divinyl ether, pentaerythritol trivinyl ether, (metha)acryl amide; N-hydroxymethyl (metha)acryl amide; N-vinyl formamide, acrylonitrile; etc. These monomers and oligomers can be used singly or in combination of two or more kinds.

When the coloring composition is to be cured through the irradiation of ultraviolet rays, a photo-polymerization initiator may be incorporated in the composition. Preferable examples of the photo-polymerization initiator are an acetophenone-based compound such as 4-phenoxy dichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, 2-benzyl-2-dimethylamino-1-(4-morpholinophenyl)-butane-1-one, etc.; a benzoin-based compound such as benzoin, benzoin methyl ether, benzoin ethyl ether, benzoin isopropyl ether, benzyldimethyl ketal, etc.; a benzophenone-based compound such as benzophenone, benzoylbenzoic acid, benzoylmethyl benzoate, 4-phenyl benzophenone, hydroxybenzophenone, acrylated benzophenone, 4-benzoyl-4'-methyldiphenyl sulfide, 3,3',4,4'-tetra(t-butylperoxycarbonyl)benzophenone, etc.; a thioxanthone-based compound such as thioxanthone, 2-chlorothioxanthone, 2-methylthioxanthone, isopropylthioxanthone, 2,4-diisopropylthioxanthone, 2,4-diethylthioxanthone, etc.; a triazine-based compound such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis (trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2,4-trichloromethyl-(piperonyl)-6-triazine, 2,4-trichloromethyl(4'-methoxystyryl)-6-triazine, etc.; an oxime ester-based compound such as 1,2-octanedione, 1-[4-(phenylthio)-1,2-(O-benzoyl oxime)], O-(acetyl)-N-(1-phenyl-2-oxo-2-(4'-methoxy-naphthyl)ethylidene)hydroxyl amine, etc.; a phosphine-based compound such as bis(2,4,6-trimethylbenzoyl) phenyl phosphine oxide, 2,4,6-trimethylbenzoyldiphenyl phosphine oxide, etc.; a quinone-based compound such as 9,10-phenanthrene quinine, camphorquinine, ethylanthraquinone, etc.; a borate-based compound; a carbazole-based compound; an imidazole-based compound; a titanocene compound; etc.

These photo-polymerization initiators may be used singly or in combination of two or more kinds.

The content of the photo-polymerization initiator may preferably be confined to 0.5-50% by mass, more preferably 3-30% by mass based on a total weight of solid matter in the coloring composition.

The coloring composition may contain, as a photosensitizer, an amine-based compound such as triethanol amine, methyldiethanol amine, triisopropanol amine, 4-dimethylaminomethyl benzoate, 4-dimethylaminoethyl benzoate, 4-dimethylaminoisoamyl benzoate, 2-dimethylaminoethyl benzoate, 4-dimethylamino-2-ethylhexyl benzoate, N,N-dimethylparatoluidine, 4,4'-bis(dimethylamino)benzophenone, 4,4'-bis(diethylamino)benzophenone, 4,4'-bis(ethylmethylamino)benzophenone, etc. These photosensitizers can be employed singly or in combination of two or more kinds thereof. With respect to the content of the photosensitizer, it may preferably be confined to the range of 0.5-60% by mass, more preferably 3-40% by mass based on a total weight of the photo-polymerization initiator and the photosensitizer.

The coloring composition may contain polyfunctional thiol acting as a chain transfer agent. As for this polyfunctional thiol, it is possible to employ a compound having two or more thiol groups. Specific examples of such a compound include hexane dithiol, decane dithiol, 1,4-butanediol bisthiopropionate, 1,4-butanediol bisthioglycolate, ethyleneglycol bisthioglycolate, ethyleneglycol bisthiopropionate, trimethylolpropane tristhioglycolate, trimethylolpropane tristhiopropionate, trimethylolpropane tris(3-mercaptobutylate), pentaerythritol tetrakisthioglycolate, pentaerythritol tetrakisthiopropionate, trimercaptopropionate tris(2-hydroxyethyl)isocyanulate, 1,4-dimethylmercaptobenzene, 2,4,6-trimercapto-s-triazine, 2-(N,N-dibutylamino)-4,6-dimercapto-s-triazine, etc. These polyfunctional thiols can be employed singly or in combination of two or more kinds.

Further, if required, the coloring composition may contain a thermal crosslinking agent, specific examples of which including, for example, melamine resin, epoxy resin, etc. Specific examples of melamine resin include alkylated melamine resin (methylated melamine resin, butylated melamine resin, etc.), mixed etherified melamine resin, etc. These melamine resins may be of a high or a low condensation type. As for the specific examples of epoxy resin, they include, for example, glycerol/polyglycidyl ether, trimethylol propane/polyglycidyl ether, resorcin/diglycidyl ether, neopentyl glycol/diglycidyl ether, 1,6-hexanediol/diglycidyl ether, ethylene glycol(polyethylene glycol)/diglycidyl ether, etc. These compounds may be used singly or in combination of two or more kinds.

If required, the coloring composition may contain an organic solvent. Specific examples of such an organic solvent include cyclohexanone, ethyl Cellosolve acetate, butyl Cellosolve acetate, 1-methoxy-2-propyl acetate, diethyleneglycol dimethyl ether, ethyl benzene, ethyleneglycol diethyl ether, xylene, ethyl Cellosolve, methyl-n-amyl ketone, propyleneglycol monomethyl ether, toluene, methylethyl ketone, ethyl acetate, methanol, ethanol, isopropyl alcohol, butanol, isobutyl ketone, petroleum solvent, etc. These organic solvents may be used singly or in combination of two or more kinds.

Then, the photosensitive coloring composition prepared as described above is coated on the surface of a substrate and subjected to prebaking. With respect to the coating method, it is possible to employ an ordinary method such as spin-coating, dip-coating, die-coating, etc. Namely, as long as it is possible to coat the coloring composition on the surface of a substrate about 40-60 cm×40-60 cm in size to form a film of uniform thickness, there is not any particular limitation with respect to the method of coating. The prebaking may preferably be performed for 10-20 minutes at a temperature of 50-120° C. With respect to the thickness of coated film, it may be optionally determined. However, when spectral transmittance, etc. are taken into account, the film thickness after the prebaking may be generally confined to around 2 μm.

Then, the substrate that has been coated with a photosensitive coloring composition and deposited with a coloring composition layer is subjected to exposure through a patterning mask. With respect to the light source for the exposure, it is possible to employ an ordinary high-pressure mercury lamp.

Thereafter, the development of the coloring composition layer that has been subjected to the exposure is performed. As for the developing solution, it is possible to employ an alkaline aqueous solution. Specific examples of the alkaline aqueous solution include an aqueous solution of sodium carbonate, an aqueous solution of sodium hydrogen carbonate, an aqueous solution of a mixture of sodium carbonate and sodium hydrogen carbonate, and any of these aqueous solutions which further contain an appropriate surfactant. After finishing the development, the resultant coloring composition layer is washed with water and dried to obtain pixels of any desired single color.

A sequence of the steps described above are repeated for a required number of colors while changing the photosensitive coloring compositions and the patterns, thereby obtaining a color filter provided with a color pattern formed of a combination of required number of colors, i.e. pixels of plural colors.

Example

Next, the present invention will be explained in detail with reference to specific examples and comparative examples, which are not intended to limit the scope of the present invention.

FIG. 1 is a cross-sectional view illustrating the color filter according to this example. In FIG. 1, a black matrix 2 is formed on the surface of substrate 1 selectively at regions between pixels which are located at the boundary portions between neighboring pixel regions. Color pixels 3R, 3G and 3B are disposed in these pixel regions, respectively. Herein, 3R represents a red pixel, 3G represents a green pixel and 3B represents a blue pixel. On these color pixels 3R, 3G and 3B, an overcoat layer 4 formed of a transparent resin is deposited.

FIG. 2 shows the liquid crystal display device provided with the color filter shown in FIG. 1.

The liquid crystal display device 7 shown in FIG. 3 is a typical example of a TFT-driving-type liquid crystal display device for use in a laptop computer, wherein the liquid crystal display device 7 is provided with a pair of transparent substrates 8 and 9 which are disposed to face each other and spaced apart from each other. Between these transparent substrates 8 and 9, a liquid crystal (LC) is introduced and the obtained structure is sealed.

Liquid crystal molecules are aligned depending on the liquid crystal alignment mode such as twisted nematic (TN), super twisted nematic (STN), in-plane switching (IPS), vertical alignment (VA), optically compensated birefringence (OCB), etc.

A thin-film transistor (TFT) array 10 is formed on the inner surface of a first transparent substrate 8 and a transparent electrode layer 11 formed of ITO for example is deposited on the TFT array 10. An aligning layer 12 is disposed on the surface of transparent electrode layer 11. On the outer surface of the transparent substrate 8 is disposed a polarizing plate 13 including a retardation film.

Meanwhile, on the inner surface of a second transparent substrate 9, a color filter 14 which is formed using the aforementioned photosensitive resin composition according one embodiment of the present invention is disposed. In many cases, a light-shielding film (not shown) having a lattice pattern called "black matrix" is interposed between the pixels of the red, green and blue colors constituting the color filter 14, thereby enabling the color filter to be partitioned into pixels. If required, an overcoat layer (not shown) may be deposited on the light-shielding film.

A transparent electrode layer 15 formed of ITO for example is deposited on the surface of the color filter 14 and an aligning layer 16 is disposed to cover the transparent electrode layer 15. Further, on the outer surface of the transparent substrate 9 is disposed a polarizing plate 17. Incidentally, a backlight unit 19 having an LED 18 is disposed below the polarizing plate 13.

Followings are explanations on a backlight device and the color filter, both constituting as components of the liquid crystal display device.

(Backlight Device)

The backlight device to be employed in this example is a surface emitting light source device which is designed to be disposed on the rear side of a liquid crystal panel and used as a rear side light source of a transmissive- or semi-transmissive-type color liquid crystal display device. This backlight device comprises an LED light source, and a light-homogenizing means which is capable of converting the LED light source into nearly surface emitting light source. With respect to the LED light source, there have been proposed one which is formed of a combination of LEDs of three colors, which are capable of emitting the lights of red wavelength, green wavelength and blue wavelength regions, or one which is formed through the coating of a green fluorescent substance and a red fluorescent substance on the surface of a blue LED to thereby whitening the light to be emitted.

The backlight device is constituted by an LED light source, a reflector for reflecting the light emitted from a light source so as to direct it to the observer's side, a substrate made of a translucent flat plate to be used as a light-conducing body for conducting and turning the light emitted from the light source into a surface emitting configuration, and a light modulating sheet forming a triangular prism-like array, these components being appropriately disposed. With respect to the manner of disposing the light source, typical examples thereof include disposing a light source immediately below the rear surface of the liquid crystal device (direct system), and disposing a light source on the sidewall to convert the light into a surface emitting configuration by making use of a translucent light-conducting body such as an acrylic plate, thus obtaining a surface emitting light source (side light system). The direct system is suitably employed in an application where a high luminescence is required and the side light system is suitably employed in an application where thinning of thickness is required. Namely, these systems are actually employed in conformity with the end-use thereof.

When a combination of three color LEDs is to be employed as an LED light source, a GaAsP-based LED is employed as a red LED having a main emission wavelength in the red region, a GaP-based LED is employed as a green LED having a main emission wavelength in the green region, and an InGaN-based LED and a GaN-based LED are employed as a blue LED having a main emission wavelength in the blue region.

Figure 4:
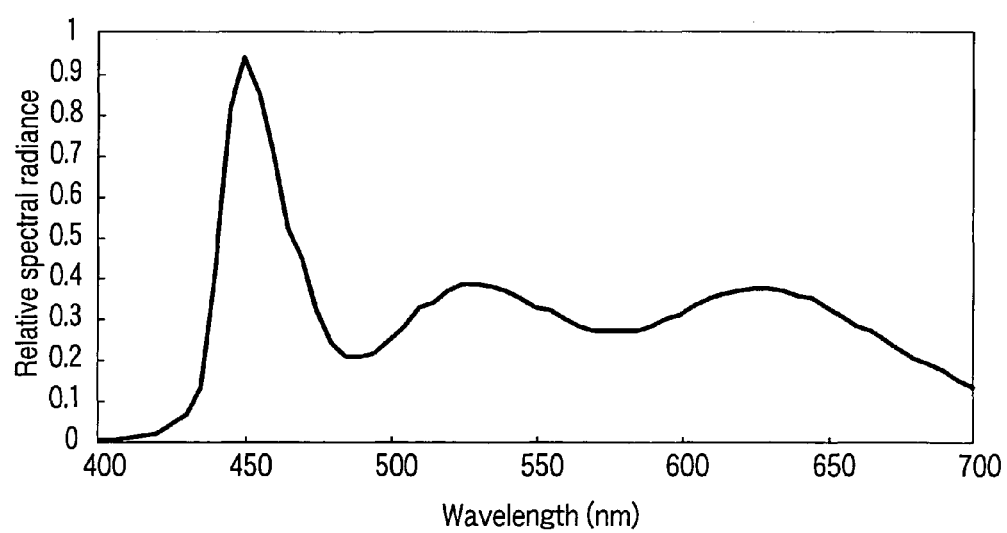
FIG. 4 is a graph illustrating the emission characteristics of a whitened LED which is effected through the coating of a green fluorescent substance and a red fluorescent substance on a blue LED.
Figure 5:
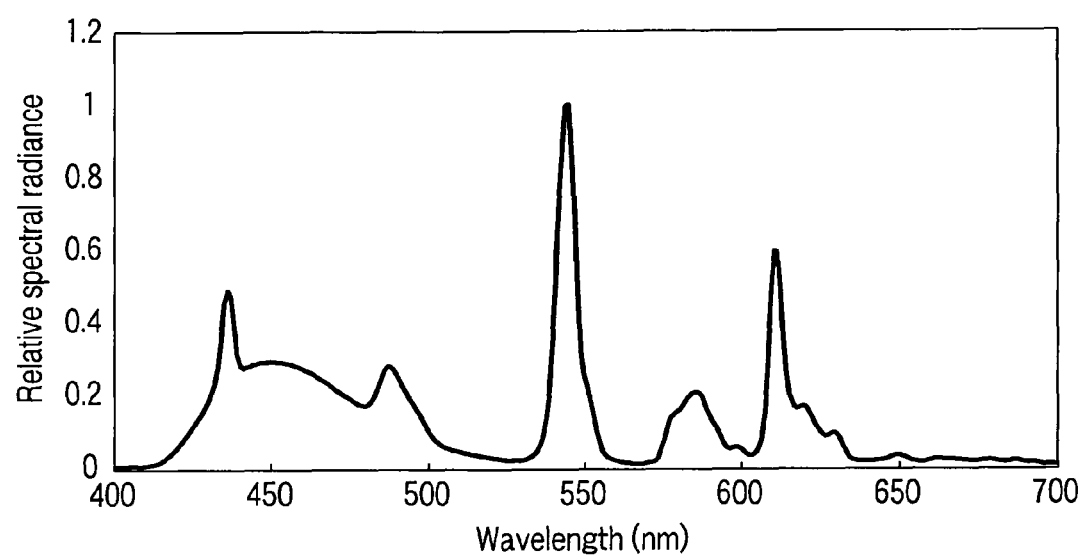
FIG. 5 is a graph illustrating the emission characteristics of a cold cathode fluorescent lamp (CCFL) which has been employed in the conventional liquid crystal display device.

FIG. 3 shows a graph illustrating the emission characteristics of a white color light source wherein a color mixture is effected through the combination of a red LED, a green LED and a blue LED. Further, FIG. 4 shows a graph illustrating the emission characteristics of a white color light source wherein a white light emission is effected through the coating of a green fluorescent substance and a red fluorescent substance on a blue LED. FIG. 5 shows a graph illustrating the emission characteristics of a cold cathode fluorescent lamp (CCFL) which has been employed in the conventional liquid crystal display device.

(Coloring Compositions)

Following pigments were employed as pigments for coloring the coloring composition to be employed for the manufacture of a color filter.

Pigments for red: C.I. Pigment Red 254 ("Irgaphor Red B-CF"; Ciba Speciality Chemicals Co., Ltd.) and C.I. Pigment Red 177 ("Cromophtal Red A2B"; Ciba Speciality Chemicals Co., Ltd.).

Pigments for green: C.I. Pigment Green 58 ("Phthalocyanine Green A110"; Dainihon Ink Chemicals Co., Ltd.), C.I. Pigment Green 36 ("Lyonol Green 6YK"; Toyo Ink Manufacturing Co., Ltd.) and C.I. Pigment Yellow 150 ("Fanchon Fast Yellow Y-5688"; Bayer Co., Ltd.)

Pigments for blue: C.I. Pigment Blue 15; ("Lionol Blue ES"; Toyo Ink Manufacturing Co., Ltd.) and C.I. Pigment Violet 23; ("Pariogen Violet 5890"; BASF Co., Ltd.).

By making use of these pigments, a red coloring composition shown in the following Table 1, a green coloring composition shown in the following Table 2, and a blue coloring composition shown in the following Table 3 were respectively prepared.

TABLE 1

| Red pigment composition | | R-1 | R-2 |
|---|---|---|---|
| Content of pigment (wt %) | PR254 | 90 | 90 |
| | PR177 | 10 | 10 |
| Content of pigment in solid matter | | 25.2% | 38.0% |

TABLE 2

| Green pigment composition | | | | | | | | | | | | |
|---|---|---|---|---|---|---|---|---|---|---|---|---|
| | | GA-1 | GA-2 | GA-3 | GA-4 | GA-5 | GA-6 | GA-7 | GA-8 | GA-9 | GA-10 | GA-11 |
| Content of pigment (wt %) | PG58 | 60 | 55 | 50 | 45 | 60 | 55 | 50 | 45 | 60 | 55 | 50 |
| | PG36 | | | | | | | | | | | |
| | PY150 | 40 | 45 | 50 | 55 | 40 | 45 | 50 | 55 | 40 | 45 | 50 |
| Content of pigment in solid matter | | 21.1% | 20.8% | 20.8% | 21.2% | 27.6% | 27.4% | 27.7% | 28.6% | 41.9% | 42.7% | 44.1% |

| Green pigment composition | | | | | | | | | |
|---|---|---|---|---|---|---|---|---|---|
| | | GB-1 | GB-2 | GB-3 | GB-4 | GB-5 | GB-6 | GB-7 | GB-8 |
| Content of pigment (wt %) | PG58 | | | | | | | | |
| | PG36 | 60 | 55 | 50 | 45 | 60 | 55 | 50 | 45 |
| | PY150 | 40 | 45 | 50 | 55 | 40 | 45 | 50 | 55 |
| Content of pigment in solid matter | | 21.1% | 20.7% | 20.6% | 20.8% | 27.6% | 27.2% | 27.3% | 27.9% |

TABLE 3

| Blue pigment composition | | B-1 | B-2 |
|---|---|---|---|
| Content of pigment (wt %) | PB15:6 | 95 | 95 |
| | PV23 | 5 | 5 |
| Content of pigment in solid matter | | 37.2% | 29.0% |

(Color Filters)

By making use of the coloring compositions thus obtained, a color filter was manufactured.

By means of spin coating, the red coloring composition shown in Table 1 was coated on the surface of a glass substrate to obtain a coated film having a thickness of 2 μm. After being dried, the coated film was subjected to a stripe-like patterning exposure by making use of an exposing apparatus. Then, the coated layer thus exposed was subjected to a developing treatment for 90 seconds in an alkaline developing solution to obtain a colored layer having stripe-like red pixels. Incidentally, the alkaline developing solution was formed of the following composition.

| | |
|---|---|
| Sodium carbonate: | 1.5 wt % |
| Sodium hydrogen carbonate: | 0.5 wt % |
| Anionic surfactant ("Perilex NBL"): | 8.0 wt % |
| Water: | 90 wt % |

In the same manner as described above, by means of spin coating, the green coloring composition shown in Table 2 was coated on the surface of substrate to obtain a coated film having a thickness of 2 μm. After being dried, by making use of an exposing apparatus, the coated film was subjected to a stripe-like patterning exposure wherein the region of the patterning exposure was offset from the region of the colored layer of red pixels. Then, the coated layer thus exposed was subjected to a developing treatment to obtain a colored layer of green pixels in the neighborhood of the coloring layer of red pixels.

Further, in the same manner as in the cases of red and green coloring compositions, the blue coloring composition shown in Table 3 was treated to obtain a coated film having a thickness of 2 μm. The coated film was then processed in the same manner as described above to obtain a colored layer of blue pixels in the neighborhood of the coloring layers of red and green pixels. As a result, it was possible to obtain a color filter having three stripe-like colored layers of red, green and blue on the transparent substrate.

By making use of the coloring compositions containing pigments at the aforementioned ratios, the red layer was prepared so as to realize x=0.640, the green layer was prepared so as to realize y=0.600, and the blue layer was prepared so as to realize y=0.060, thereby manufacturing three-color type color filters, each having a combinations of the coloring compositions employed in the examples and the comparative examples shown in the following Tables 4 to 7. Although the adjusted chromatic values were based on EBU standard values adopted in the broadcasting standards, the chromatic values may not be restricted by these ranges.

Three-color color filters CF-1-CF-4 which were manufactured according to the aforementioned method using R-1 as a red coloring composition, GA-1-GA-4 as a green coloring composition and B-1 as a blue coloring composition were used in combination with a backlight device having a white color light source wherein a red LED, a green LED and a blue LED were combined so as to create a mixed color, thereby formulating various examples represented by Examples 1-4. Likewise, three-color type color filters CF-5-CF-8 which were manufactured using GA-5-GA-8 as a green coloring composition were used in combination with a backlight device having a whitened LED which was obtained by coating a blue LED with a green fluorescent substance and a red fluorescent substance, thereby formulating various examples represented by Examples 5-8.

Further, three-color type color filters CF-9-CF-12 which were manufactured according to the aforementioned method using R-1 as a red coloring composition, GB-1-GB-4 as a green coloring composition and B-1 as a blue coloring composition were used in combination with a backlight device having a white color light source wherein a red LED, a green LED and a blue LED were combined so as to create a mixed color, thereby formulating various examples represented by Comparative Examples 1-4. Likewise, three-color type color filters CF-13-CF-16 which were manufactured using GB-5-GB-8 as a green coloring composition were used in combination with a backlight device having a white light emission LED which was obtained by coating a blue LED with a green fluorescent substance and a red fluorescent substance, thereby formulating various examples represented by Comparative Examples 5-8.

Further, three-color type color filters CF-1-CF-8 were used in combination with a backlight device having CCFL, thereby formulating various examples represented by Comparative Examples 9-16.

Furthermore, three-color type color filters CF-17-CF-19 which were manufactured according to the aforementioned method using R-2 as a red coloring composition, GA-9-GA-11 as a green coloring composition and B-2 as a blue coloring composition were used in combination with a backlight device having a cold cathode fluorescent lamp (hereinafter referred to as CCFL), thereby formulating various examples represented by Comparative Examples 17-19.

The concentration of the green pigment in the solid matter existing in the green layer, the dielectric loss tangent of the green layer at 20 Hz and the NTSC ratio were compared among these Examples 1-8 and Comparative Examples 1-19, the results being indicated in the following Tables 4-7.

TABLE 4

| | Example 1 | Example 2 | Example 3 | Example 4 | Example 5 | Example 6 | Example 7 | Example 8 |
|---|---|---|---|---|---|---|---|---|
| Color filter | CF-1 | CF-2 | CF-3 | CF-4 | CF-5 | CF-6 | CF-7 | CF-8 |
| Red pigment composition | R-1 | R-1 | R-1 | R-1 | R-1 | R-1 | R-1 | R-1 |
| Green pigment composition | GA-1 | GA-2 | GA-3 | GA-4 | GA-5 | GA-6 | GA-7 | GA-8 |
| Blue pigment composition | B-1 | B-1 | B-1 | B-1 | B-1 | B-1 | B-1 | B-1 |
| Dielectric tangent of green layer @20 Hz | 0.0070 | 0.0070 | 0.0070 | 0.0071 | 0.0092 | 0.0092 | 0.0093 | 0.0095 |
| Dielectric tangent of green layer <0.01 | ○ | ○ | ○ | ○ | ○ | ○ | ○ | ○ |

TABLE 4-continued

|  | Example 1 | Example 2 | Example 3 | Example 4 | Example 5 | Example 6 | Example 7 | Example 8 |
|---|---|---|---|---|---|---|---|---|
| Backlight | LED-1 | LED-1 | LED-1 | LED-1 | LED-2 | LED-2 | LED-2 | LED-2 |
| NTSC ratio | 73.3 | 72.6 | 71.8 | 71.1 | 72.2 | 71.6 | 71.1 | 70.5 |
| NTSC ratio >70% | ○ | ○ | ○ | ○ | ○ | ○ | ○ | ○ |

TABLE 5

|  | Comparative Example 1 | Comparative Example 2 | Comparative Example 3 | Comparative Example 4 |
|---|---|---|---|---|
| Color filter | CF-9 | CF-10 | CF-11 | CF-12 |
| Red pigment composition | R-1 | R-1 | R-1 | R-1 |
| Green pigment composition | GB-1 | GB-2 | GB-3 | GB-4 |
| Blue pigment composition | B-1 | B-1 | B-1 | B-1 |
| Dielectric tangent of green layer @20 Hz | 0.0290 | 0.0285 | 0.0284 | 0.0287 |
| Dielectric tangent of green layer <0.01 | X | X | X | X |
| Backlight | LED-1 | LED-1 | LED-1 | LED-1 |
| NTSC ratio | 73.9 | 73.1 | 72.3 | 71.6 |
| NTSC ratio >70% | ○ | ○ | ○ | ○ |

|  | Comparative Example 5 | Comparative Example 6 | Comparative Example 7 | Comparative Example 8 |
|---|---|---|---|---|
| Color filter | CF-13 | CF-14 | CF-15 | CF-16 |
| Red pigment composition | R-1 | R-1 | R-1 | R-1 |
| Green pigment composition | GB-5 | GB-6 | GB-7 | GB-8 |
| Blue pigment composition | B-1 | B-1 | B-1 | B-1 |
| Dielectric tangent of green layer @20 Hz | 0.0381 | 0.0376 | 0.0377 | 0.0384 |
| Dielectric tangent of green layer <0.01 | X | X | X | X |
| Backlight | LED-2 | LED-2 | LED-2 | LED-2 |
| NTSC ratio | 72.9 | 72.2 | 71.6 | 71.0 |
| NTSC ratio >70% | ○ | ○ | ○ | ○ |

TABLE 6

|  | Comparative Example 9 | Comparative Example 10 | Comparative Example 11 | Comparative Example 12 |
|---|---|---|---|---|
| Color filter | CF-1 | CF-2 | CF-3 | CF-4 |
| Red pigment composition | R-1 | R-1 | R-1 | R-1 |
| Green pigment composition | GA-1 | GA-2 | GA-3 | GA-4 |
| Blue pigment composition | B-1 | B-1 | B-1 | B-1 |
| Backlight | CCFL | CCFL | CCFL | CCFL |
| NTSC ratio | 51.0 | 50.7 | 50.3 | 50.1 |
| NTSC ratio >70% | X | X | X | X |

|  | Comparative Example 13 | Comparative Example 14 | Comparative Example 15 | Comparative Example 16 |
|---|---|---|---|---|
| Color filter | CF-5 | CF-6 | CF-7 | CF-8 |
| Red pigment composition | R-1 | R-1 | R-1 | R-1 |
| Green pigment composition | GA-5 | GA-6 | GA-7 | GA-8 |
| Blue pigment composition | B-1 | B-1 | B-1 | B-1 |
| Backlight | CCFL | CCFL | CCFL | CCFL |
| NTSC ratio | 60.3 | 59.7 | 59.1 | 58.7 |
| NTSC ratio >70% | X | X | X | X |

TABLE 7

| | Comparative Example 17 | Comparative Example 18 | Comparative Example 19 |
|---|---|---|---|
| Color filter | CF-17 | CF-18 | CF-19 |
| Red pigment composition | R-2 | R-2 | R-2 |
| Green pigment composition | GA-9 | GA-10 | GA-11 |
| Blue pigment composition | B-2 | B-2 | B-2 |
| Dielectric tangent of green layer @20 Hz | 0.060 | 0.072 | 0.078 |
| Dielectric tangent of green layer <0.01 | X | X | X |
| Backlight | CCFL | CCFL | CCFL |
| NTSC ratio | 71.1 | 70.5 | 70.0 |
| NTSC ratio >70% | ○ | ○ | X |

It will be recognized from the above-described Table 4 that in the cases of the liquid crystal display devices (Examples 1-8) which were provided with a backlight device having LEDs, and with a color filter having a green layer containing C.I. Pigment Green 58 and having a dielectric loss tangent of not more than 0.01, the NTSC ratio was not less than 70% in every liquid crystal display devices and, moreover, the color reproducibility was found excellent. Further, the dielectric loss tangent of the green layer was less than 0.01 in every liquid crystal display devices, thereby making it possible to obtain excellent display qualities without generating not only the turbulence in alignment of liquid crystal molecules in the pixel regions but also the deviation of the threshold values of driving voltage.

In contrast, as shown in the above Table 5, in the cases of the liquid crystal display devices (Comparative Examples 1-8) which were provided with a color filter having a green layer exhibiting a dielectric loss tangent of more than 0.01 and containing no C.I. Pigment Green 58, turbulences in the alignment of liquid crystal molecules in the pixel regions and the image burn due to deviation of the threshold values of driving voltage occurred, thus making it impossible to obtain excellent display qualities even if these liquid crystal display devices were provided with a backlight device having LEDs.

Further, as shown in the above Table 6, in the cases of the liquid crystal display devices (Comparative Examples 9-16) which were provided with a backlight device having CCFL, even if they were provided with a color filter having a green layer containing C.I. Pigment Green 58 and exhibiting a dielectric loss tangent of not more than 0.01, the NTSC ratio thereof was less than 70% in every liquid crystal display devices and the color reproducible range thereof was too small, thus indicating inappropriate display quality for use as a television image display device.

Further, as shown in the above Table 7, in the cases of the liquid crystal display devices (Comparative Examples 17-19) which were provided with a color filter having a green layer containing C.I. Pigment Green 58 but exhibiting a dielectric loss tangent of more than 0.01 and with a backlight device having CCFL, turbulences in the alignment of liquid crystal molecules in the pixel regions and the image burn due to deviation of the threshold values of driving voltage occurred, thus making it impossible to obtain excellent display qualities.

What is claimed is:

1. A liquid crystal display device which comprises:
   a backlight device provided with an LED; and
   a color filter having colored layers of plural colors including a green layer,
   the green layer containing brominated zinc phthalocyanine green pigment, and
   a dielectric loss tangent of the green layer at 20 Hz being confined to not more than 0.02.

2. The liquid crystal display device according to claim 1, wherein the content of coloring materials constituting the green layer of the color filter is confined to not more than 30% by weight based on a weight of the green layer, and a chromaticity of the green layer when light from the LED backlight is transmitted is regulated such that "y" is not less than 0.60 in XYZ color system and a color reproduction region of the color filter in xy chromaticity is not less than 70% based on NTSC ratio.

3. The liquid crystal display device according to claim 1, wherein the backlight device has a red LED, a green LED and a blue LED.

4. The liquid crystal display device according to claim 1, wherein the backlight device has a white LED device including a combination of a blue LED, and a green fluorescent substance and a red fluorescent substance.

5. A color filter for the liquid crystal display device recited in claim 1, wherein the green layer contains a green pigment formed of brominated zinc phthalocyanine and a yellow pigment, a content of the green pigment in a total weight of the pigments is not more than 70%, and a content of the green pigment in a weight of the green layer is not more than 30%.

6. A color filter for the liquid crystal display device recited in claim 1, wherein the green layer contains a green pigment formed of C.I. Pigment Green 58 and at least one kind of yellow pigment selected from the group consisting of C.I. Pigment Yellow 185, C.I. Pigment Yellow 150, C.I. Pigment Yellow 139 and C.I. Pigment Yellow 138, a content of the C.I. Pigment Green 58 in a total weight of the pigments is not more than 70%, and a content of the pigment in a weight of the green layer is not more than 30%.

7. A liquid crystal display device which comprises:
   a backlight device provided with an LED; and
   a color filter having colored layers of plural colors including at least a green layer and an overcoat layer formed of a transparent resin,
   the green layer containing brominated zinc phthalocyanine green pigment, and
   a dielectric loss tangent of a laminate layer of the green layer and the overcoat layer at a driving frequency of a liquid crystal display device being confined to not more than 0.02.

8. The liquid crystal display device according to claim 7, wherein the content of coloring materials constituting the green layer of the color filter is confined to not more than 30% by weight based on a weight of the green layer, and a chromaticity of the green layer when light from the LED backlight is transmitted is regulated such that "y" is not less than 0.60 in XYZ color system and a color reproduction region of the color filter in xy chromaticity is not less than 70% based on NTSC ratio.

9. The liquid crystal display device according to claim 7, wherein the backlight device has a red LED, a green LED and a blue LED.

10. The liquid crystal display device according to claim 7, wherein the backlight device has a white LED device including a combination of a blue LED, and a green fluorescent substance and a red fluorescent substance.

11. A color filter for the liquid crystal display device recited in claim 7, wherein the green layer contains a green pigment formed of brominated zinc phthalocyanine and a yellow pigment, a content of the green pigment in a total weight of the pigments is not more than 70%, and a content of the green pigment in a weight of the green layer is not more than 30%.

12. A color filter for the liquid crystal display device recited in claim 7, wherein the green layer contains a green pigment formed of C.I. Pigment Green 58 and at least one kind of yellow pigment selected from the group consisting of C.I. Pigment Yellow 185, C.I., Pigment Yellow 150, C.I. Pigment Yellow 139 and C.I. Pigment Yellow 138, a content of the C.I. Pigment Green 58 in a total weight of the pigments is not more than 70%, and a content of the pigment in a weight of the green layer is not more than 30%.

* * * * *